(12) United States Patent
Rimoni et al.

(10) Patent No.: US 7,706,796 B2
(45) Date of Patent: Apr. 27, 2010

(54) USER TERMINAL-INITIATED HARD HANDOFF FROM A WIRELESS LOCAL AREA NETWORK TO A CELLULAR NETWORK

(75) Inventors: Yoram Rimoni, Haifa (IL); Eitan Yacobi, Zichron Ya'akov (IL)

(73) Assignee: Qualcomm Incorporated, San Diego, CA (US)

( * ) Notice: Subject to any disclaimer, the term of this patent is extended or adjusted under 35 U.S.C. 154(b) by 515 days.

(21) Appl. No.: 11/249,984

(22) Filed: Oct. 12, 2005

(65) Prior Publication Data

US 2007/0049276 A1 Mar. 1, 2007

Related U.S. Application Data

(63) Continuation-in-part of application No. 11/219,064, filed on Sep. 1, 2005.

(51) Int. Cl.
H04W 36/00 (2006.01)
(52) U.S. Cl. ............... 455/436; 455/437; 455/440; 455/441; 455/442; 455/443
(58) Field of Classification Search .......... 455/436–444
See application file for complete search history.

(56) References Cited

U.S. PATENT DOCUMENTS

| 7,068,669 | B2 | 6/2006 | Abrol et al. |
| 7,096,022 | B2 | 8/2006 | Gao et al. |
| 7,280,505 | B2 | 10/2007 | Chaskar et al. |
| 7,356,001 | B1 | 4/2008 | Jones et al. |
| 2002/0154627 | A1 | 10/2002 | Abrol et al. |
| 2003/0092444 | A1 | 5/2003 | Sengodan et al. |
| 2003/0134638 | A1 | 7/2003 | Sundar et al. |
| 2004/0067754 | A1 | 4/2004 | Gao et al. |
| 2004/0146021 | A1 | 7/2004 | Fors et al. |

(Continued)

FOREIGN PATENT DOCUMENTS

EP 1538779 6/2005

(Continued)

OTHER PUBLICATIONS

International Search Report dated Feb. 19, 2007 for PCT/US2006/040164.

*Primary Examiner*—Joseph H Feild
*Assistant Examiner*—Huy D Nguyen
(74) *Attorney, Agent, or Firm*—Albert J. harnois, Jr.; Kam T. Tam

(57) ABSTRACT

A system and method are provided for supporting a multi-mode portable user terminal (UT) hard handoff procedure for a call from a wireless local area network (WLAN) to a cellular telephone network. The method includes: establishing a link between a UT and a serving WLAN; establishing a call via the established WLAN link; monitoring the WLAN link signal strength; simultaneously monitoring a serving cellular network; initiating a hard handoff to the cellular network, responsive to the monitored WLAN link signal strength falling below a minimum threshold; and, continuing the call via the cellular network. More specifically, the method initiates a call handoff to a Cellular Gateway (CGW) telephone number, responsive to the monitored WLAN link signal strength falling below the minimum threshold. Then, continuing the call via the cellular network includes continuing the call to the first telephone number via the CGW handoff telephone number.

20 Claims, 5 Drawing Sheets

U.S. PATENT DOCUMENTS

| | | |
|---|---|---|
| 2005/0048977 A1 | 3/2005 | Dorenbosch et al. |
| 2005/0059400 A1 | 3/2005 | Jagadeesan et al. |
| 2005/0192009 A1 | 9/2005 | Shaheen et al. |
| 2005/0265284 A1 | 12/2005 | Hsu et al. |
| 2006/0116127 A1* | 6/2006 | Wilhoite et al. ............. 455/442 |
| 2006/0178147 A1* | 8/2006 | Jagadeesan et al. ......... 455/436 |
| 2006/0240828 A1* | 10/2006 | Jain et al. .................. 455/436 |
| 2006/0270447 A1* | 11/2006 | Everson et al. ........... 455/552.1 |

FOREIGN PATENT DOCUMENTS

| | | |
|---|---|---|
| WO | 04016010 | 2/2004 |
| WO | 05036901 | 4/2005 |
| WO | 06020168 | 2/2006 |

* cited by examiner

USER TERMINAL-INITIATED HARD HANDOFF FROM A WIRELESS LOCAL AREA NETWORK TO A CELLULAR NETWORK

CLAIM OF PRIORITY UNDER 35 U.S.C. §120

The present application for patent is a Continuation-in-Part of patent application Ser. No. 11/219,064, entitled HARD HANDOFF FROM A WIRELESS LOCAL AREA NETWORK TO A CELLULAR TELEPHONE NETWORK filed Sep. 1, 2005, pending, and assigned to the assignee hereof and hereby expressly incorporated by reference herein.

BACKGROUND

1. Field

This invention generally relates to wireless communications and, more particularly, to a User Terminal (UT)-initiated system and method for a hard handoff from a wireless local area network (WLAN) to a cellular telephone network.

2. Background

WLANs compliant with IEEE 802.11, Bluetooth, and networks generally compliant with IEEE 802.15, such as wireless personal area network (WPANs) and ultra-wideband (UWB) networks, all share the characteristics of being relatively low power networks with high data rates. Bluetooth and 802.15 networks are envisioned for use in a "personal space", such as an office, room, or car, while 802.11 networks operate at larger power levels and are intended to cover larger geographical areas.

All the above-mentioned networks can be enabled to support wireless communications services conventionally associated with cellular telephones, such as voice calls and data streaming. However, while cellular telephone links are relatively robust, WLAN links are more susceptible to interruption. When a cellular user terminal (UT) reaches the boundary of a cell site, there is usually enough time to handoff an in-progress call to an adjoining cell. Handoff procedures between WLAN hotspots or access points (APs) are not as well established as they are for cellular networks. WLAN networks are designed for packet data communications, as opposed to real-time voice communications. The delays associated with reacquiring a hotspot are not as noticeable when data is being communicated.

In addition, WLAN coverage planning is often incomplete or sporadic. Further, the small geographical area associated with a hotspot means that a UT can move from a strong link, to loss of coverage almost instantaneously. The end result is that calls being carried by a WLAN link are susceptible to being dropped before any kind of handoff can be engaged to another access point or network.

It would be advantageous if a hard handoff procedure existed, to transfer a call being carried by a WLAN link, to a cellular telephone network, in the event that the WLAN network link is lost.

SUMMARY

Accordingly, a method is provided for supporting a multi-mode portable user terminal (UT) hard handoff procedure for a call from a wireless local area network (WLAN) to a cellular telephone network. The method comprises: establishing a link between a UT and a serving WLAN; establishing a call via the established WLAN link; monitoring the WLAN link signal strength; simultaneously monitoring a serving cellular network; initiating a hard handoff to the cellular network, responsive to the monitored WLAN link signal strength falling below a minimum threshold; and, continuing the call via the cellular network.

More specifically, the method establishes a call with a first telephone number via the WLAN link, and initiates a call handoff to a Cellular Gateway (CGW) telephone number, responsive to the monitored WLAN link signal strength falling below the minimum threshold. Then, continuing the call via the cellular network includes continuing the call to the first telephone number via the CGW handoff telephone number.

The WLAN link call can be either a Mobile Originated (MO) call or a Mobile Terminated (MT) call. If the WLAN link call is an MT call, the call is continued as an MT via the cellular network, even though the UT initiates the call handoff to the CGW.

The method further comprises: receiving cellular network resource allocations in a common control channel message, responsive to initiating the call to the CGW telephone number; and, tuning to an allocated traffic channel within the cellular network. Then, continuing the call via the cellular network includes continuing the call using the allocated traffic channel.

Additional details of the above-described method, a system supporting a hard handoff procedure for transferring a call from a WLAN to a cellular network, and a multi-mode portable UT for supporting such a hard handoff procedure are provided below.

DETAILED DESCRIPTION

Figure 1:
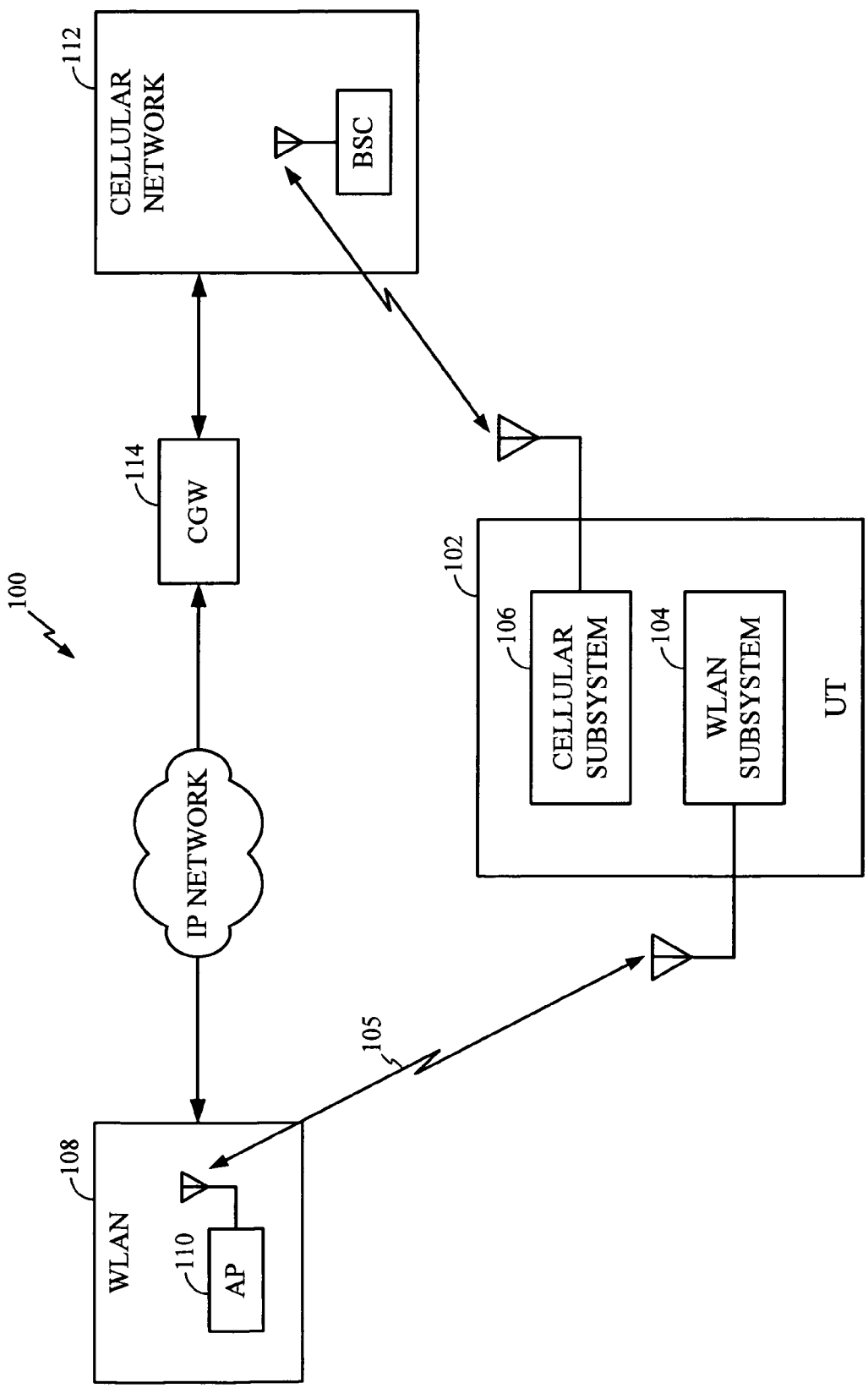
FIG. 1 is a schematic block diagram of a system supporting a hard handoff procedure for transferring a call from a wireless local area network (WLAN) to a cellular network.

FIG. 1 is a schematic block diagram of a system supporting a hard handoff procedure for transferring a call from a wireless local area network (WLAN) to a cellular network. The system 100 comprises a user terminal (UT) 102, which further comprises a WLAN subsystem 104 and cellular subsystem 106. The WLAN subsystem 104 can be used to establish call through a link 105 between the UT 102 and a serving WLAN 108. The WLAN subsystem 104 monitors the WLAN signal strength. For example, the WLAN subsystem 104 may monitor the received signal strength from a communicating Access Point (AP) 110. Alternately, the WLAN subsystem may monitor its own transmit power levels. As is understood by those skilled in the art, the WLAN subsystem wireless interface may include baseband, de/modulation, and transceiver circuitry not shown, along with an antenna.

The cellular subsystem 106 is registered with, and monitors a serving cellular telephone network 112. This description is intended to describe a UT that is registered with a cellular network, but not actively engaged in a cellular network telephone call. However, the cellular subsystem initiates a call handoff to a Cellular Gateway (CGW) 114 responsive to the monitored WLAN link 105 signal strength falling below a minimum threshold. Alternately, the UT WLAN subsystem 104, or some other entity of the UT, may detect that the call has been dropped, and initiate a hard handoff of the basis of the call being dropped in the WLAN link. As is understood by those skilled in the art, the cellular subsystem 106 wireless interface may include baseband, de/modulation, and transceiver circuitry not shown, along with an antenna.

The CGW 114 has an interface to the UT cellular subsystem 106 via the cellular network 112, and an interface to the WLAN 108 via an Internet Protocol (IP) network. The CGW 114 receives the call handoff from the UT cellular subsystem 106, supplies cellular network resources to the UT cellular subsystem 106, and continues the call initially established through the WLAN link 105. Alternately, the CGW 114 is understood to be a component of the cellular network 112.

The call initially carried via the WLAN link 105 may be either a Mobile Originated (MO) or a Mobile Terminated (MT) call. If the initial WLAN link call is MO, then it is relatively simple to conceive of the call being continued via the cellular network as a MO call, since it is the UT 102 that initiates the process, by making a call handoff to the CGW 114. However, if the initial WLAN link call is an MT call, then it may be desirable that the call be continued through the cellular network as an MT call, from the perspective of the UT 102. For example, the UT 102 may be billed differently if the call is continued as an MO call. However, in one aspect of the system, the CGW 114 records the call handoff as an MT call, if the call originated as an MT call via the WLAN network 108.

Figure 4:
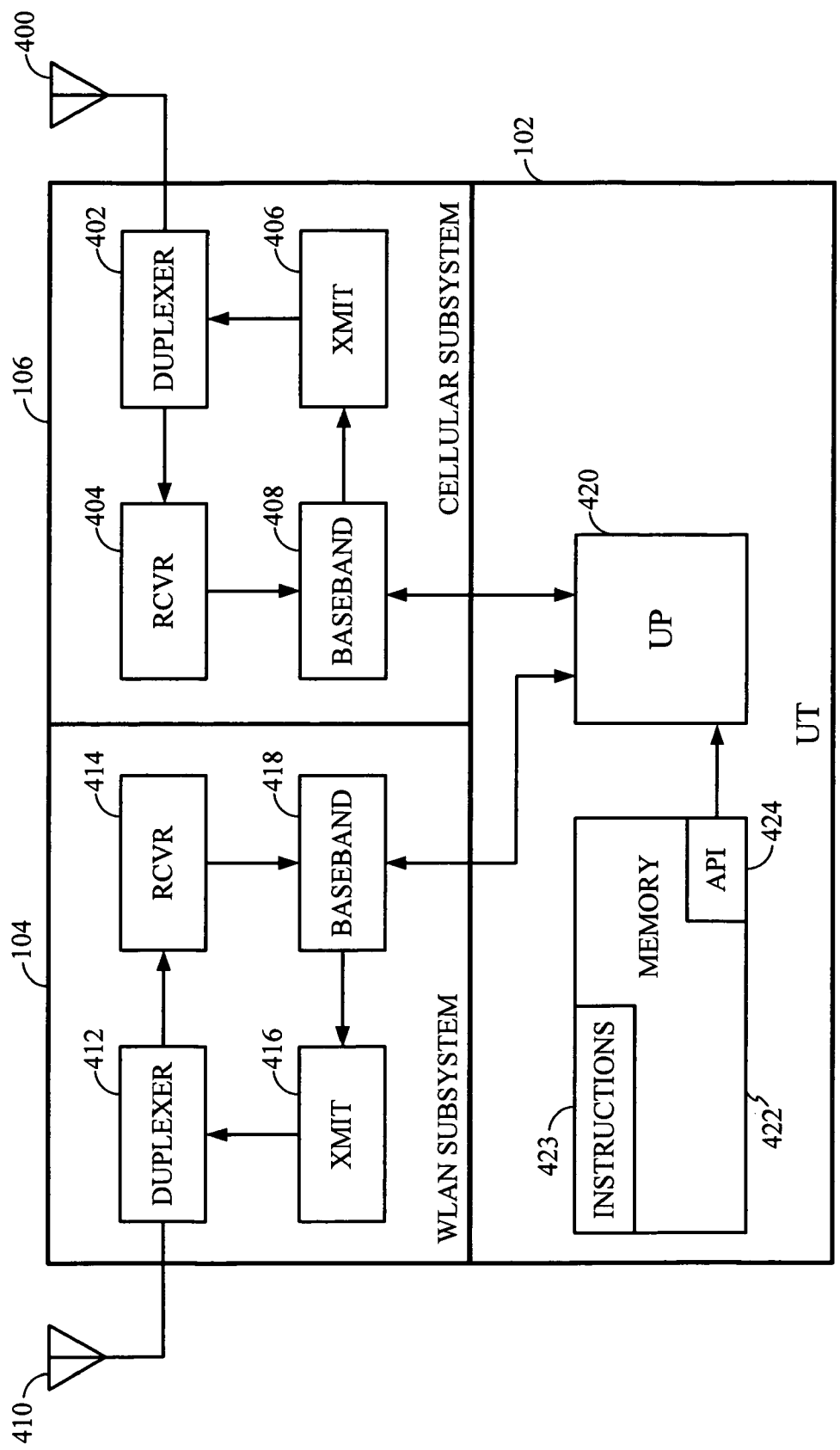
FIG. 4 is a more detailed schematic block diagram of the User Terminal shown in FIG. 1.

FIG. 4 is a more detailed schematic block diagram of the User Terminal shown in FIG. 1. Alternately, the invention can be considered from the perspective of a multi-mode portable UT for supporting a hard handoff procedure for a call from a WLAN to a cellular telephone network. As noted above, the UT comprises a WLAN subsystem 104 for establishing a link 105 between the UT 102 and a serving WLAN 110, establishing a call via the established WLAN link 105, and monitoring the WLAN signal strength. The cellular subsystem 106 monitors a serving cellular telephone network 112, initiates a hard handoff to the cellular network 112 responsive to the monitored WLAN link signal strength falling below a minimum threshold. The cellular subsystem 106 continues the call via the cellular network 112.

The WLAN subsystem 104 is capable of establishing a call with the serving WLAN 108 in a format such as packet data, voice over Internet Protocol (VoIP), or video telephony (VT). The WLAN subsystem 104 may, for example, establish the call with an IEEE 802.11, Bluetooth, or IEEE 802.15 network WLAN. However, the invention is not limited to any particular type of WLAN network or call format.

The cellular subsystem 106 is capable of continuing the call via the cellular network 112 in a format such as packet data, VoIP, or circuit switched (CS). The UT cellular subsystem 106 continues the call via a Code Division Multiple Access (CDMA), Global System for Mobile Communications (GSM), or Universal Mobile Telecommunications System (UMTS) cellular network. However, the invention is not limited to any particular type of cellular network or call format.

As is conventional, the cellular subsystem 106 typically includes an antenna 400, a duplexer 402, a receiver (RCVR) 404, with demodulation circuitry (not shown), a transmitter (XMIT) 406, with modulation circuitry (not shown), and a baseband unit 408. Likewise, the WLAN subsystem 104 typically includes an antenna 410, a duplexer 412, a receiver (RCVR) 414, with demodulation circuitry (not shown), a transmitter (XMIT) 416, with modulation circuitry (not shown), and a baseband unit 418.

Also shown is a microprocessor (uP) 420 and a memory 422. Software instructions 423, capable of generating microprocessor commands, are shown stored in memory 422. It should be understood that that the functions generally described as being performed by the WLAN subsystem 104 and cellular subsystem 106, are more specifically performed as a result of commands generated by the microprocessor 420. The commands generated by the microprocessor 420 are responsive to instructions from a software application 423 stored in memory 422, which is in turn responsive to information supplied by baseband units 408 and 418. In one aspect, the microprocessor 420 executes instructions 423 using a Binary Runtime Environment for Wireless (BREW) application and Application Program Interface (API) 424 connected to the baseband units 408 and 418. Alternately but not shown, instructions can be carried out using a state machine such as a programmable gate array.

Referencing both FIGS. 1 and 4, the WLAN subsystem 104 establishes a call with a first telephone number associated with a peer user (remote party), not shown. The remote party with the first number may be associated with the same cellular network 112, a different cellular network (not shown), or in a POTS network (not shown), to name a few examples. The cellular subsystem 106 initiates a call handoff to a Cellular Gateway (CGW) telephone number responsive to the monitored WLAN link signal strength falling below the minimum threshold. The cellular subsystem 106 continues the call to the first telephone number via the CGW handoff telephone number.

The UT cellular subsystem 106 calls the CGW handoff telephone number in a conventional manner. Upon receiving a request for the CGW telephone number, the cellular network assigns a traffic channel and sets up a call between the UT and the CGW using conventional cellular network procedures. That is, the cellular subsystem 106 receives cellular network resources in a common control channel, responsive to initiating the call handoff to the CGW telephone number. Then, the cellular subsystem 106 tunes to an allocated traffic channel and continues the call using the allocated traffic channel.

The CGW telephone number may be a predetermined single number that is known by a UT prior to registering with the cellular network 112. Alternately, the cellular network may assign a CGW telephone number to the UT 102 upon registration, or upon initiating a call via the WLAN network. In other aspects, a plurality of telephone numbers may be used by the UT to access the CGW 114. For example, different CGW telephone numbers may be cross-referenced to different WLAN networks. Alternately, different CGW telephone numbers may be cross-referenced to different types of cellular network subscribers. In another aspect (discussed in more detail below), different CGW telephone numbers may be used depending on whether the initial WLAN call is an MO or MT call. In a different aspect, different CGW telephone numbers are cross-referenced to a status associated with the UT's calling partner.

As noted above, the WLAN subsystem may establish either an MO call or an MT call. The categorization of the continued call may be important to the user of the UT, as the minutes associated with an MT call may be charged differently than MO call minutes. In the simplest scenario, the initial WLAN call (to a first telephone number) is an MO call, and since the UT initiates the call handoff to the CGW, the call that is continued (to the first telephone number) through the cellular network is recorded as an MO call.

However, if the initial WLAN call is an MT call, the cellular subsystem continues the call handoff to the CGW telephone number as an MT call, even though the UT initiates the call handoff to the CGW. As noted above, this may be accomplished by using a special CGW telephone, assigned to MT calls only. Alternately, the CGW receives MO/MT call status in control channel communications with the UT, or through control channel communications with the peer user (the device associated with the first telephone number). In another aspect, the CGW 114 is involved in creating a linkage between the first telephone number and the call initially established through the WLAN network 108. As a result, the CGW already knows the MO/MT call status, prior to the handoff.

FUNCTIONAL DESCRIPTION

The following technical discussion of the invention is based primarily upon a CDMA air interface, but the same solution can be easily adapted to other air interfaces, such as GSM and UMTS. Likewise, although an exemplary IEEE 802.11 WLAN is shown, the invention is not limited to merely this example. The present invention has several advantages over prior art approaches. The UT software implementation is simpler, and the present invention can be implemented using conventional methods for inter-BSC hard hand off. Further, the present invention process reduces the delay in the handoff call process and simplifies call traffic routing at the core network.

Figure 2:
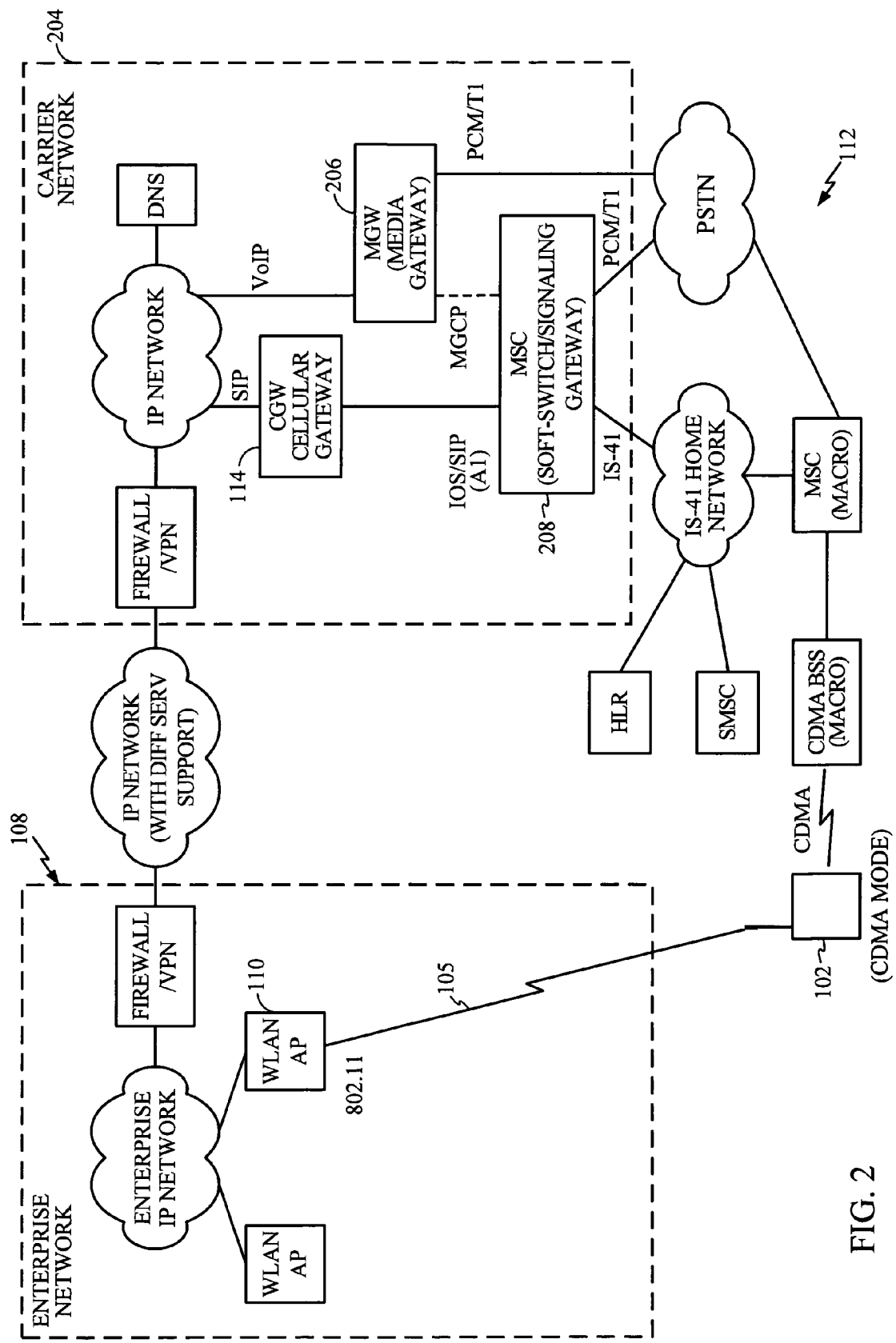
FIG. 2 is a more detailed depiction of the network topology of FIG. 1.

FIG. 2 is a more detailed depiction of the network topology of FIG. 1. The cellular network 112 and the WLAN network 108 are connected via an IP core network 204. The IP network 204 comprises the following functional components. A Media Gateway 206 terminates the PCM/T1 or PCM/E1 on the PSTN side, and converts them to IP-based traffic. In the reverse direction, the Media Gateway 206 terminates VoIP and converts to PCM. The Media Gateway 206 is controlled by the Signaling Gateway 208 using MGCP (Media Gateway Control Protocol).

The Signaling Gateway 208 is a unit about equivalent to a conventional MSC (Mobile Switching Center). It uses the IOS (IS-2001) over IP to communicate with a Radio Access Network (RAN), and IS-41 to communicate with legacy cellular core network elements (i.e., MSC, HLR (Home Location Register) and SMSC (Short Message Service Center)). In this case, the Signaling Gateway 208 interfaces to the Cellular Gateway (CGW) 114, which acts in a manner that is similar to a conventional Base Station Controller (BSC).

The Cellular Gateway (CGW) 114 connects to the WLAN network 108 and the cellular network 112. It acts as a Session Initiation Protocol (SIP) entity on the WLAN side, and is seen as a BSC on the cellular network side. The CGW 114 is involved in setting up the VoIP call on the WLAN side, and if necessary, is involved in the handover of the call to the cellular network. The CGW 114 holds a database for each active call. Each active call entry holds: the calling number and the called number. In addition, the CGW 114 may create an IMSI-MAC (Media Access Control) association for each UT (Mobile) connected via the WLAN 108.

Although there are commercially available solutions that provide SIP-PSTN connectivity, namely a SIP Gateway, the CGW is a novel component supporting the present invention functionality. For example, the CGW should be able to support a proprietary period measurement message generated by the UT, and transfer call linkage from a WLAN network to a cellular network.

A dual technology Mobile Station (MS), or dual-mode UT 102 is able to operate in both the WLAN network 108 and the cellular network 112. In other words, the UT supports both protocols, but does not necessarily permit simultaneous operation in dedicated modes.

The hand off from a SIP-based call running over the WLAN network 108, to a call running in cellular native mode, is UT-initiated. That is, the UT collects information and makes the decision to perform a Hard Handoff (HHO). However, both the UT 102 and the network 112 have important roles in accomplishing the HHO.

The UT 102 is initially assumed to be engaged in call linked via the WLAN network 108. While call is active, the CGW 114 holds the call parameters, such as the means of identifying the UT in both the cellular and WLAN networks. While in the WLAN dedicated mode (in active call), the UT continuously monitors the signal strength of both the WLAN and the cellular network. The UT may send periodic reports on the reception quality of both networks to the CGW. The CGW, based on these reports, may decide to hand off the UT from the WLAN, to the cellular network. In this case, the CGW initiates a procedure similar to an inter-BSC (inter/intra MSC) hard handoff procedure, asking for resource allocation on the cellular network side to permit the call to continue using the cellular network.

However, a UT-initiated HHO procedure is advantageous in the event of a sudden loss of the WLAN link. When the UT initially enters a dedicated mode (an active call) over the WLAN access network, the CGW notifies the UT of a "CGW handover phone number". The CGW handover phone number may be a unique dummy number that is assigned to each CGW. In case of a sudden loss of the WLAN call, the UT and CGW perform the following steps:

If the CGW detects the WLAN call is lost, it does not disconnect the call leg with the remote party, who has also been referred to herein as the first telephone number. Simultaneously, the UT originates a conventional cellular call to the "CGW handover phone number". The CGW connects the incoming call from the UT with the remote party call leg, using the UT cellular network identity (i.e., IMSI) as a key to identify the appropriate call leg.

Figure 3:
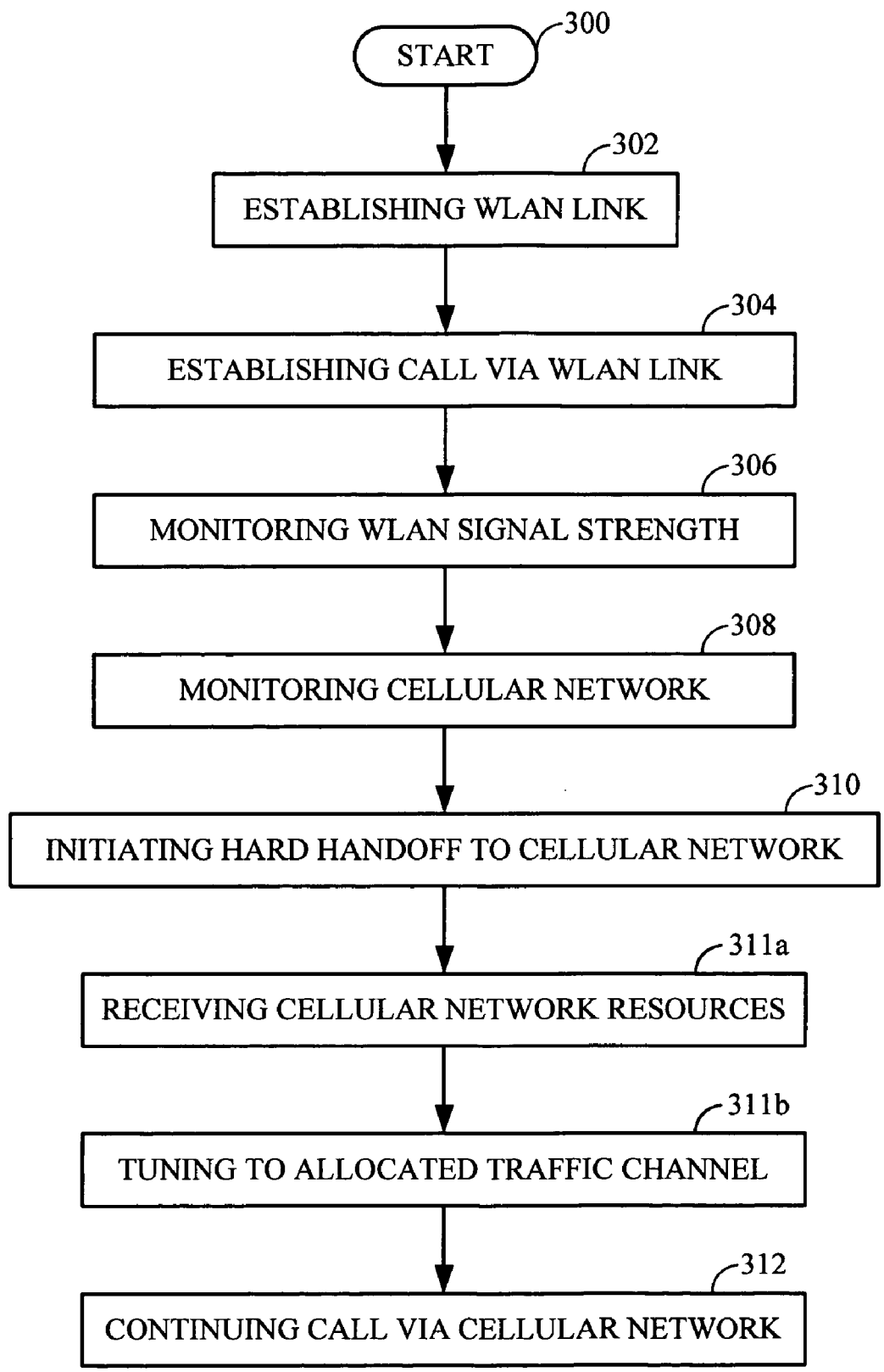
FIG. 3 is a flowchart illustrating a method for supporting a multi-mode portable UT hard handoff procedure for a call from a WLAN to a cellular telephone network.

FIG. 3 is a flowchart illustrating a method for supporting a multi-mode portable UT hard handoff procedure for a call from a WLAN to a cellular telephone network. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 300.

Step 302 establishes a link between a UT and a serving WLAN. Step 304 establishes a call via the established WLAN link. Step 306 monitors the WLAN link signal strength. Step 308 simultaneously monitors a serving cellular network. Step 310 initiates a hard handoff to the cellular network, responsive to the monitored WLAN link signal strength falling below a minimum threshold. Step 312 continues the call via the cellular network.

In one aspect, establishing the call between the UT and the serving WLAN in Step 304 includes establishing a call in a one of the following formats: packet data, VoIP, or video telephony (VT). In another aspect, Step 304 establishes the call with a WLAN such as a IEEE 802.11, Bluetooth, or IEEE 802.15 networks. However, the method is not necessarily limited to the above-mentioned call formats or networks.

In a different aspect, continuing the call via the cellular network in Step 312 includes continuing the call in one of the following formats: VoIP, packet data, or circuit switched (CS). In another aspect, Step 312 continues the call via a cellular network such as a CDMA, GSM, or UMTS network. However, the method is not necessarily limited to the above-mentioned call formats or networks.

In one aspect, establishing the call via the established WLAN link in Step 304 includes establishing a call with a first telephone number (remote party) via the WLAN link. Then, initiating a hard handoff to the cellular network, responsive to the monitored WLAN link signal strength falling below the minimum threshold, includes initiating a call handoff to a Cellular Gateway (CGW) telephone number. Continuing the call via the cellular network in Step 312 includes continuing the call to the first telephone number via the CGW handoff telephone number.

In another aspect, Step 311a receives cellular network resource allocations in a common control channel message, responsive to initiating the call to the CGW telephone number (Step 310). Step 311b tunes to an allocated traffic channel within the cellular network. Then, Step 312 continues the call using the allocated traffic channel.

In another aspect, establishing the call with the first telephone number via the WLAN link in Step 304 includes establishing either an MO or MT call. If the first telephone call is initially established as an MT call, continuing the call via the cellular network in Step 312 includes continuing the handoff call to the CGW telephone number as an MT call.

Figure 5:
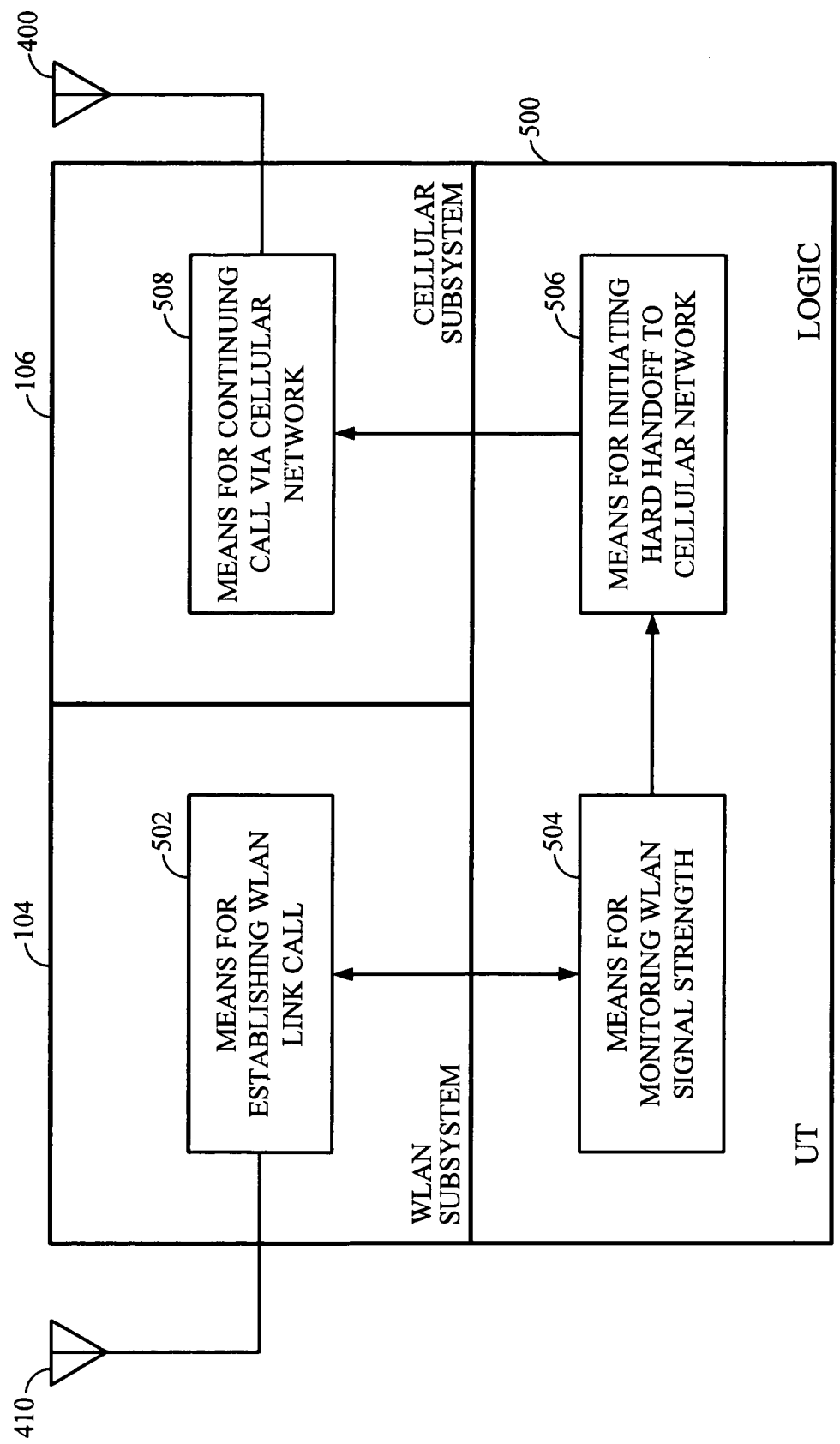
FIG. 5 is schematic block diagram depicting a variation of the multi-mode portable UT of FIG. 4, for supporting a hard handoff procedure for a call from a WLAN to a cellular telephone network.

FIG. 5 is schematic block diagram depicting a variation of the multi-mode portable UT of FIG. 4, for supporting a hard handoff procedure for a call from a WLAN to a cellular telephone network. The UT 102 comprises a means for establishing a call via a WLAN link (502), and a means for monitoring the WLAN link signal strength (504). Also shown is a means for initiating a hard handoff to a cellular network (506), responsive to the monitored WLAN link signal strength falling below a minimum threshold. The UT 102 also comprises a means for continuing the call via a cellular network (508).

Viewing both FIGS. 4 and 5, means 502 (FIG. 5) is typically enabled using a WLAN subsystem 104 (FIG. 4). However, the operation of the WLAN subsystem 104 conventionally requires some support of the microprocessor 420, memory 422, and instructions 423. Means 504 is enabled through the cooperation of the WLAN subsystem 104, with microprocessor 420, memory 420, and software instructions 423. However, the function is typically a software operation using data supplied by the WLAN subsystem 104. Means 506 is typically enabled through the cooperation of cellular subsystem 106, with microprocessor 420, memory 420, and software instructions 423. Means 506 is typically a software operation that supplies commands to the cellular subsystem 106. Means 508 is primarily associated with cellular subsystem 106, with support from the microprocessor 420, memory 422, and instructions 423.

In one aspect, the means for establishing the call via the WLAN link (502) includes establishing a call to a first telephone number. Then, the means for initiating the hard handoff (506) includes initiating a call handoff to a Cellular Gateway (CGW) telephone number, and the means for continuing the call via the cellular network (508) includes continuing the call to the first telephone number via the CGW handoff telephone number.

A system and method have been provided for a UT-initiated hard handoff process that transfers a call from a WLAN network to a cellular network. Examples have been provided to illustrate the invention, especially in the context of CDMA and 802.11 networks. However, the invention is not limited to merely these examples. Other variations and embodiments of the invention will occur to those skilled in the art.

What is claimed is:

1. In a multi-mode portable user terminal (UT), a method for supporting a hard handoff procedure for a call from a wireless local area network (WLAN) to a cellular telephone network, the method comprising:
   establishing a link between a UT and a serving WLAN;
   establishing a call via the established WLAN link;
   monitoring the WLAN link signal strength;
   simultaneously monitoring a serving cellular network;
   initiating a hard handoff to the cellular network, responsive to the monitored WLAN link signal strength falling below a minimum threshold;
   continuing the call via the cellular network;
   wherein establishing the call via the WLAN link includes establishing a Mobile Terminated (MT) call; and
   wherein continuing the call via the cellular network includes continuing the call as an MT call.

2. The method of claim 1 wherein establishing the call between the UT and the serving WLAN includes establishing a call in a format selected from the group consisting of packet data, voice over Internet Protocol (VoIP), and video telephony (VT).

3. The method of claim 1 wherein continuing the call via the cellular network includes continuing the call in a format selected from the group consisting of VoIP, packet data, and circuit switched (CS).

4. The method of claim 1 wherein establishing the call between the UT and the serving WLAN includes establishing the call with a WLAN selected from the group consisting of IEEE 802.11, Bluetooth, and IEEE 802.15 networks.

5. The method of claim 1 wherein continuing the call via the cellular network includes continuing the call via a cellular network selected from the group consisting of Code Division Multiple Access (CDMA), Global System for Mobile Communications (GSM), and Universal Mobile Telecommunications System (UMTS).

6. The method of claim 1 wherein establishing the call via the established WLAN link includes establishing the call with a first telephone number via the WLAN link;
   wherein initiating a hard handoff to the cellular network includes initiating a call handoff to a predetermined Cellular Gateway (CGW) telephone number that depends on the call being an MT call; and
   wherein continuing the call via the cellular network includes continuing the call to the first telephone number via the CGW handoff telephone number.

7. The method of claim 6 further comprising:
   receiving cellular network resource allocations in a common control channel message, responsive to initiating the call to the CGW telephone number;
   tuning to an allocated traffic channel within the cellular network; and
   wherein continuing the call via the cellular network includes continuing the call using the allocated traffic channel.

8. A multi-mode portable user terminal (UT) for supporting a hard handoff procedure for a call from a wireless local area network (WLAN) to a cellular telephone network, the UT comprising:

a WLAN subsystem for establishing a link between the UT and a serving WLAN, establishing a call via the established WLAN link, and monitoring the WLAN link signal strength;

a cellular subsystem for monitoring a serving cellular telephone network, initiating a hard handoff to the cellular network responsive to the monitored WLAN link signal strength falling below a minimum threshold, and continuing the call via the cellular network;

wherein the WLAN subsystem is further operable to establish the call as a Mobile Terminated (MT) call; and wherein the cellular subsystem is further operable to continue as an MT call.

9. The UT of claim 8 wherein the WLAN subsystem establishes a call with the serving WLAN in a format selected from the group consisting of packet data, voice over Internet Protocol (VoIP), and video telephony (VT).

10. The UT of claim 8 wherein the cellular subsystem continues the call via the cellular network in a format selected from the group consisting of packet data, VoIP, and circuit switched (CS).

11. The UT of claim 8 wherein the WLAN subsystem establishes the call with a WLAN selected from the group consisting of IEEE 802.11, Bluetooth, and IEEE 802.15 networks.

12. The UT of claim 8 wherein the cellular subsystem continues the call via a cellular network selected from the group consisting of Code Division Multiple Access (CDMA), Global System for Mobile Communications (GSM), and Universal Mobile Telecommunications System (UMTS).

13. The UT of claim 8 wherein the WLAN subsystem establishes the call with a first telephone number, and wherein the cellular subsystem initiates a call handoff to a predetermined Cellular Gateway (CGW) telephone number that depends on the call being an MT call, and continues the call to the first telephone number via the CGW handoff telephone number.

14. The UT of claim 13 wherein the cellular subsystem receives cellular network resources in a common control channel, responsive to initiating the call handoff to the CGW telephone number, tunes to an allocated traffic channel, and continues the call using the allocated traffic channel.

15. A system supporting a hard handoff procedure for transferring a call from a wireless local area network (WLAN) to a cellular network, the system comprising:

a user terminal (UT) comprising:
  a WLAN subsystem to establish a call through a link between the UT and a serving WLAN, and monitor the WLAN signal strength, and
  a cellular subsystem to register with and monitor a serving cellular telephone network, and initiate a call handoff to a Cellular Gateway (CGW), responsive to the monitored WLAN link signal strength falling below a minimum threshold;

a CGW having an interface to the UT cellular subsystem via a cellular network, for receiving the call handoff from the UT cellular subsystem, supplying cellular network resources to the UT cellular subsystem, and continuing the call initially established through the WLAN link;

wherein the UT WLAN subsystem initially establishes the call as a Mobile Terminated (MT) call; and wherein the CGW records the call handoff as an MT call.

16. The system of claim 15, wherein the WLAN subsystem is further operable to establish the call with a first telephone number; and wherein the cellular subsystem is further operable to initiate the call handoff to a predetermined Cellular Gateway (CGW) telephone number that depends on the call being an MT call, and continues the call to the first telephone number via the CGW handoff telephone number.

17. A multi-mode portable user terminal (UT) for supporting a hard handoff procedure for a call from a wireless local area network (WLAN) to a cellular telephone network, the UT comprising:

means for establishing a call via a WLAN link;

means for monitoring the WLAN link signal strength;

means for simultaneously monitoring a serving cellular network;

means for initiating a hard handoff to the cellular network, responsive to the monitored WLAN link signal strength falling below a minimum threshold;

means for continuing the call via the cellular network;

wherein the means for establishing the call via the WLAN link includes means for establishing a Mobile Terminated (MT) call; and wherein the means for continuing the call via the cellular network includes means for continuing the call as an MT call.

18. The UT of claim 17 wherein the means for establishing the call via the WLAN link includes establishing a call to a first telephone number;

wherein the means for initiating the hard handoff includes means for initiating a call handoff to a predetermined Cellular Gateway (CGW) telephone number that depends on the call being an MT call; and wherein the means for continuing the call via the cellular network includes means for continuing the call to the first telephone number via the CGW call handoff telephone number.

19. A computer program product for supporting a hard handoff procedure for a call from a wireless local area network (WLAN) to a cellular telephone network, comprising:

a memory comprising:
  at least one instruction for causing a computer to establish a link between a user terminal (UT) and a serving WLAN;
  at least one instruction for causing the computer to establish a call via the established WLAN link;
  at least one instruction for causing the computer to monitor the WLAN link signal strength;
  at least one instruction for causing the computer to simultaneously monitor a serving cellular network;
  at least one instruction for causing the computer to initiate a hard handoff to the cellular network, responsive to the monitored WLAN link signal strength falling below a minimum threshold;
  at least one instruction for causing the computer to continue the call via the cellular network;
  wherein the at least one instruction for causing the computer to establish the call via the WLAN link includes at least one instruction for causing the computer to establish a Mobile Terminated (MT) call; and
  wherein the at least one instruction for causing the computer to continue the call via the cellular network includes at least one instruction for causing the computer to continue the call as an MT call.

20. The computer program product of claim 19, wherein the at least one instruction for causing the computer to establish the call via the WLAN link includes at least one instruction for causing the computer to establish the call with a first telephone number via the WLAN link;

wherein the at least one instruction for causing the computer to initiate the hard handoff to the cellular network includes at least one instruction for causing the computer to initiate a call handoff to a predetermined Cellular Gateway (CGW) telephone number that depends on the call being an MT call; and wherein the at least one instruction for causing the computer to continue the call via the cellular network includes at least one instruction for causing the computer to continue the call to the first telephone number via the CGW handoff telephone number.

\* \* \* \* \*

UNITED STATES PATENT AND TRADEMARK OFFICE
Certificate

Patent No. 7,706,796 B2　　　　　　　　　　　　　　　　　Patented: April 27, 2010

On petition requesting issuance of a certificate for correction of inventorship pursuant to 35 U.S.C. 256, it has been found that the above identified Patent, through error and without any deceptive intent, improperly sets forth the inventorship.

Accordingly, it is hereby certified that the correct inventorship of this Patent is: Yoram Rimoni, Haifa (IL); Eitan Yacobi, Zichron Ya'akov (IL); Ron Keidar, Haifa (IL); and Samer Zreiq, Haifa (IL).

Signed and Sealed this Twenty-fourth Day of July 2012.

MOHAMMAD GHAYOUR
*Supervisory Patent Examiner*
Art Unit 2627
Technology Center 2600